July 6, 1965  B. J. SAVAGE  3,192,789
UNIVERSAL MECHANICAL POWER TRANSMISSION COUPLING
Filed March 18, 1963  2 Sheets-Sheet 1

INVENTOR.
BILLY J. SAVAGE
BY
Dunlap Laney & Hubbard
ATTORNEYS

July 6, 1965   B. J. SAVAGE   3,192,789
UNIVERSAL MECHANICAL POWER TRANSMISSION COUPLING
Filed March 18, 1963   2 Sheets-Sheet 2

INVENTOR.
BILLY J. SAVAGE
BY
Dunlap, Laney & Hubbard
ATTORNEYS

United States Patent Office 3,192,789
Patented July 6, 1965

3,192,789
UNIVERSAL MECHANICAL POWER
TRANSMISSION COUPLING
Billy J. Savage, 2116 S. Boston Drive, Fort Smith, Ark.
Filed Mar. 18, 1963, Ser. No. 265,942
9 Claims. (Cl. 74—385)

This invention relates to a coupling for transmitting power from a powered shaft to a driven shaft. More particularly, the invention relates to a combination geartrain mechanical coupling arrangement which permits two shafts which at all times occupy different planes to be drivingly coupled between points on each shaft or imaginary projections thereof which are spaced from each other and lie in rotational axes extending normal to the longitudinal axes of the shafts and about which the shafts may be rotated.

A great many types of universal joints and couplings have heretofore been devised for changing the direction of mechanical motion. One of the more familiar and widely used types of universal coupling is that which is employed in the drive shaft of automobiles, and which embodies the general principle of a so-called Hooke's universal joint in which two shaft segments are drivingly connected through two yokes mounted at right angles to each other, and each keyed to one of the shafts and connected through pins journalled in the yokes and secured to each other at a right angle. These types of universal joints, however, have a disadvantage in some applications in that the coupling or joint elements rotate with the shafts they connect and do not in themselves provide any agency through which a body carrying one of the interconnected shafts may be connected to a body which supports or carries the other interconnected shaft. Also, since the shafts must be connected in end-to-end relation and thus at times may occupy a common plane, the movements of the shafts relative to each other cannot be truly universal because the shafts will interfere with each other when moving in the same plane. It is also immpossible to use this type of joint to interconnect the ends of two shafts when the shafts occupy two spaced, parallel planes.

Efforts to overcome the cited disadvantages of the Hooke's type universal joint have led to the development of various types of gear type couplings, which permit the two shafts to be coupled though they lie in two spaced, parallel planes. Examples of this type of coupling may be found in Vutz U.S. Patent 2,421,044, Heinsohn, Jr., U.S. Patent 2,445,828, Stone U.S. Patent 509,404, Seeger et al. U.S. Patent 667,415, Garey U.S. Patent 501,415, and West U.S. Patent 2,764,899. While these couplings do permit the two shafts to be rotated through 360° relative to each other, such rotative movement is limited to the two spaced, parallel planes in which the two shafts are located since the housing or other member used to retain the gears in mesh limits movement of each shaft to a single plane and maintains these planes in the same angular (usually parallel) relationship to each other.

The limitations of gear type couplings of the type described may be partially overcome by incorporating additional Hooke type universal joints in one or both of the shafts, as shown in the West patent and in the Vutz patent, or by using a series of rockable yokes and intermediate shafting, as shown in Standeford U.S. Patent 1,356,231. The former arrangement, however, reincorporates in the coupling some of the disadvantages of the Hooke universal joint. The latter arrangement is expensive and still requires a shaft connection between driving and driven shafts, which intermediate connecting shaft is also driven in rotation. The intermediate connecting shaft therefore cannot serve as a non-driven pin accomplishing the dual function of retaining the gears of the coupling in mesh with each other and simultaneously providing a strong mechanical connecting member to allow a body such as a vehicle carrying, say, the drive shaft, to be connected through the pin to a second body or vehicle carrying the driven shaft. This requirement is encountered, for example, in semi-trailer tractor-trailer hookups in which the trailer vehicle is connected to the tractor vehicle for towing through a pin carried by the trailer vehicle which engages a fifth wheel mounted on the frame of the tractor vehicle. In the majority of instances where the described tractor-trailer arrangement is employed in transportation, the trailer will be provided with at least one power driven unit which must be supplied with power from a suitable power take-off provided on the tractor vehicle.

Several problems are presented by the necessity to transmit power from the tractor vehicle to a power driven device on the trailer vehicle. It will be apparent that, in the first place, the power transmission employed must be severable or easily disconnected when the trailer vehicle is detached from the tractor vehicle by disengagement of the pin carried by the trailer vehicle from the fifth wheel mounted on the tractor. Therefore, one requirement of the power transmission is that it be readily breakable or disconnectable at a midpoint between the power take-off and the power driven device.

Secondarily, the power take-off on the tractor is usually located at a lower horizontal level than the power driven device on the trailer vehicle, or if such is not the case, is located at a lower level than the pin-fifth wheel connection between the two vehicles. It is therefore usually necessary that the direction of power transmission be altered or changed one or more times between the power take-off and the power driven unit on the trailer.

A third requirement of the power transmission used to transmit power from the power take-off of the tractor vehicle to the power driven unit on the trailer is that the power transmission include a flexible coupling which is in the nature of a universal joint or coupling which will permit shafting mounted on the trailer vehicle and used to transmit power into the power driven unit to be moved in substantially any direction relative to the shafting mounted on the tractor vehicle and connected to the power take-off. This requirement results from the various types of motions of the trailer vehicle relative to the tractor vehicle which may be encountered in normal road operations and which include the so-called jackknifing motion, in which the trailer tends to swing from side to side in a horizontal plane relative to the tractor vehicle, and up-and-down motion in which both the tractor and trailer vehicle may move in a vertical plane relative to each other as a result of differences in the vertical level of the roadway or surface supporting the two units.

Attempts to provide an ideal or highly satisfactory power transmission system for transmitting power from the power take-off of the tractor vehicle to a power driven unit on the trailer vehicle have thus far been unsuccessful. Where gear type couplings of the type hereinbefore described have been used, the couplings have usually required the inclusion of one or more universal joints in the shafting to accommodate the transmission to the up-and-down movement of the coupled vehicles. The Hooke type universal joints, when so employed, have limited the amount of torque which could be imposed upon the shafting and have been subject to earlier malfunction in the service life of the transmission system than the remaining elements of the system. Attempts to eliminate the use of the Hooke universal joints by employment of an arrangement (such as is shown in the Standeford patent) in which an intermediate driven shaft is used to bridge the vertical distance between the power take-off shaft on the tractor and the shaft leading to the power driven unit on the trailer have also been unsuccessful because of the subjection of this shaft to mechanical stress as the tractor and trailer vehicles shift closer or farther apart from each other, and also as they change their angle with respect to each other in a vertical plane. Any bending of the intermediate shaft used to interconnect the driving and driven shafts, of course, renders the transmission system inoperative and requires costly repairs. Moreover, the amount of power which can be transmitted through an intermediate shaft arrangement, such as that shown in the Standeford patent, is not as great as desirable when the diameter of the intermediate shaft is limited as is necessary by the requirements imposed in the coupling of tractor and trailer vehicles in the manner described.

The present invention provides a novel power transmission coupling which may be easily integrated with a mechanical coupling of the type represented by the connecting pin and fifth wheel in a tractor-trailer arrangement so that the mechanical coupling and the power transmission coupling share a common axis, which axis is not utilized in transmitting power from the tractor to the trailer in the sense that an intermediate shaft coincident with the common axis is driven in rotation. Although the coupling of the invention is especially well-adapted for use in transmitting power from the tractor to a trailer vehicle where these vehicles are coupled through a pin and fifth wheel, the coupling of the invention is not limited to such use and may be employed in any situation where it is desired to transmit power from a drive shaft which occupies at all times a different plane from that occupied by a driven shaft. Such power transmission is accomplished through a gear type coupling having a common axis with a pin or connecting member which functions dually to interconnect a body carrying the drive shaft with a body carrying the driven shaft, and also to support the gears of the coupling in mesh with each other. Truly universal movement is obtainable between the drive shaft and driven shaft connected through the coupling of the present invention in that the shafts may move in any direction relative to each other and may assume any angle with respect to each other. Reduction or elimination of intermediate shafting between the driving and driven shaft permits the coupling of the invention to be compact in size and to avoid reductions in intermediate shafting diameter which might otherwise be required by a particular environment of use and therefore reduce the amount of power which can be safely transmitted through the coupling.

In a relatively broad, though non-limiting aspect, the present invention comprises a power transmission assembly for interconnecting a rotating driving shaft to a rotated driven shaft through a non-rotating supporting arm, said assembly permitting said interconnecting shafts to assume any angle relative to each other. The power transmission assembly includes an idler shaft which extends substantially normal to one of said interconnected shafts; gear means connected between said one interconnected shaft and said idler shaft for transferring rotary motion between said idler shaft and said one interconnected shaft, said gear means retaining said one interconnected shaft and said idler shaft in power transmitting engagement when said one interconnected shaft is bodily rotated about the longitudinal axis of said idler shaft in a manner such that the longitudinal axis of said one interconnecting shaft remains in a tangential relationship to an imaginary circle of predetermined radius coaxially positioned with respect to the longitudinal axis of said idler shaft; yoke means rotatably journalled on said idler shaft; a first gear wheel keyed to said idler shaft for rotation therewith; a second gear wheel rotatably supported on said yoke mechanism in spaced relation from said idler shaft and engaging said first gear wheel at a predetermined angle to change the direction of the axis of rotative movement from that of the rotational axis of said first gear wheel; a supporting arm rotatably journalled on said yoke means for rotation relative to said second gear wheel and about the axis of rotation of said second gear wheel, said supporting arm rotatably journalling said other interconnected shaft and fixing said shaft in a plane extending through the axis of rotation of said second gear wheel; and a third gear wheel coaxially keyed to said other interconnected shaft and drivingly engaging said second gear wheel whereby said third gear wheel may be revolved around the axis of rotation of said second gear wheel when said supporting arm is rotated in said yoke.

The invention is particularly adapted for use as an improvement in power transmissions between tractor and trailer vehicles coupled by a pin carried on the trailer and a fifth wheel carried on the tractor, the improvement comprising a gear wheel mounted on the tractor vehicle and rotatable about an axis extending transversely across the tractor vehicle; a drive shaft flexibly connected from the power take-off of the tractor vehicle to the gear wheel for driving the gear wheel in rotation; a pair of meshing gears adapted to translate rotational motion in one plane to rotational motion in a second plane extending substantially normal to the first mentioned plane; means carried by, and secured to, the trailer for rotatably supporting one of the meshing gears in a position to engage the gear wheel carried by the tractor when the pin of the trailer and the fifth wheel of the tractor are engaged, said means functioning to retain the engagement of said one meshing gear and said gear wheel with each other in all positions of movement in a vertical plane of either the tractor or trailer vehicle when these vehicles are in fore and aft alignment along their longitudinal axes; a second means secured to the trailer for rotatably supporting the other of the meshing gears on the trailer in a position to mesh with the first mentioned meshing gear in all positions to which the tractor and trailer vehicle may move relative to each other in a horizontal plane when the vehicles are connected through the pin and fifth wheel; and a shaft carried by the trailer vehicle and drivingly interconnecting the second mentioned meshing gear with a powered unit located on the trailer vehicle. The described arrangement permits, as has been indicated hereinbefore, the tractor and trailer to move in any direction or with any motion relative to each other. The coupling also permits power of large magnitude to be transmitted between the two vehicles and provides a strong durable mechanical coupling between the vehicles which cooperates with the power transmission coupling in supporting some of the gear elements thereof and in retaining said gear elements in constant mesh with each other.

From the foregoing description of the invention, it will be apparent that it is an object of the present invention to provide a power transmission assembly which permits two shafts occupying different planes to be coupled to each other at points along the longitudinal axis of the shafts which are spaced from each other with said coupling functioning to permit the shafts to be moved in any direction relative to each other and to assume any angle relative to each other.

Another object of the present invention is to provide a power transmission coupling which may be effectively used to transmit power from a tractor vehicle to a power driven unit on a trailer vehicle where such vehicles are coupled through a pin carried by the trailer and a fifth wheel on the tractor.

A further object of the invention is to provide a strong, durable power transmission coupling which may be relatively economically constructed and maintained.

In addition to the specified objects and advantages of the invention, additional objects and advantages may be clearly inferred from, or are expressly set out in, the detailed description of the invention which follows when such description is considered in conjunction with the accompanying drawings which illustrate my invention.

Figure 1:
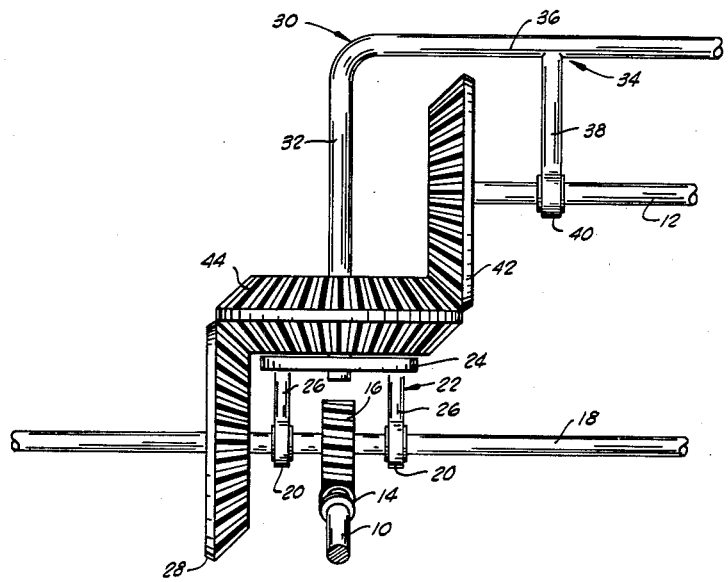
FIGURE 1 is a view in elevation of one embodiment of the novel power transmission assembly or coupling of the present invention.

Referring now to the drawings in detail and particularly to FIGURE 1, one embodiment of the power transmission assembly of the invention comprises a drive shaft 10 which is connected through the novel power transmission coupling of the invention to a driven shaft 12. The drive shaft 10 carries at some point in its length, such as near the end thereof as shown in FIGURE 1, a suitable gear such as the worm gear 14. The elements (not shown) which support and position the drive shaft 10 function to retain the worm gear 14 at all times in mesh or driving engagement with a gear wheel 16 which is keyed to an idler shaft 18 extending at an angle to the longitudinal axis of drive shaft 10. Although in the embodiment of the invention illustrated in FIGURE 1, the idler shaft 18 is shown extending substantially normal to the longitudinal axis of the drive shaft 10, it will be apparent as the description of the invention proceeds that the drive shaft and idler shaft could be positioned at other angles with respect to each other, provided only that the worm gear 14 is positioned and supported to at all times mesh with the gear wheel 16. It will also be apparent that the shaft 10 can be rotated about an axis extending transversely through the worm gear 14, provided only that the worm gear is always maintained at a fixed radial distance from the longitudinal axis of the idler shaft 18 corresponding to the radius of the gear wheel 16. In most embodiments of the invention, it will be desirable to rotatably support and journal the idler shaft 18 at its ends (not seen) by some suitable means such as pillow blocks, trunnions or the like. However, this is not essential to the operation of the invention since, in some forms of the invention, the idler shaft 18 may be rotatably supported at other points than at its ends.

Rotatably journalled through a pair of hubs 20 upon the idler shaft 18 is a yoke designated generally by reference character 22. The yoke 22 may assume many forms, but in the embodiment of the invention illustrated in FIGURE 1, comprises a generally circular plate 24 which has secured thereto a pair of legs 26 which are spaced from each other on the plate 24 and extend normal thereto from the plate to the hubs 20. From the described construction of the yoke 22, it will be perceived that the yoke may be rocked about the longitudinal axis of the shaft 18. Although the plate 24 is illustrated extending parallel to the idler shaft 18, in other embodiments of the invention it may be desirable to have the plate 24 extended at an angle with respect to the axis of the idler shaft 18.

A gear wheel 28 is keyed to the idler shaft 18 for rotation therewith and is positioned relatively close to the yoke 22 for a purpose hereinafter described. The gear wheel 28 in the embodiment illustrated in FIGURE 1 of the drawings assumes the form of a bevel gear although other forms of gears may be employed, provided only that they are gear wheels which are adapted to transmit the rotational movement of the idler shaft 18 to an engaging or meshing gear. The relative spacing along the idler shaft 18 of the gear wheel 16 and the gear wheel 28 is not critical and will be varied in accordance with the particular system or environment in which it is desired to incorporate the invention. Thus, although the embodiment illustrated in FIGURE 1 depicts the gear wheel 16 positioned between the hubs 20 on the idler shaft 18, this gear wheel may be moved to the outside of the hubs 20 and along the idler shaft 18 to any desired position without detrimentally affecting the operation of the invention.

A supporting arm 30 is positioned on the side of the idler shaft 18 occupied by the yoke 22 and is adapted for attachment to a body or vehicle which carries the driven shaft 12 and a powered unit or device which is to be propelled by the driven shaft 12. In the embodiment of the invention illustrated in FIGURE 1, the supporting arm 30 includes a rod 32 which extends normal to the longitudinal axis of the idler shaft 18 and is adapted to be rotatably journalled in the yoke means 22. In the form of the invention illustrated in FIGURE 1, the rod 32 would be journalled through the center of the circular plate 24 of the yoke means 22. The rod 32 may be permanently rotatably secured in the yoke 22 or it may be detachably positioned therein during the use of the power transmission coupling, as will be subsequently explained when the use of the invention in transmitting power from a tractor to a trailer vehicle is considered.

The supporting means 30 further includes a bracket 34 or other suitable means which functions to properly fix the position of the rod 32 in relation to the driven shaft 12 which is rotatably carried or supported by the bracket 34. In the form of the invention illustrated in FIGURE 1, the bracket 34 includes a rod or shaft 36 which extends substantially normal to the rod 32 and which carries a normally extending rod 38 which journals through a hub 40 at its free end, the driven shaft 12. The hub 40 is splined on the driven shaft 12 to prevent axial movement of this shaft relative to the rod 38. At some point along the driven shaft 12, such as at its end as shown in the embodiment shown in FIGURE 1, the shaft 12 carries a gear wheel 42 which is dimensioned and positioned to mesh with suitable gear means 44 rotatably and coaxially carried on the rod 32 and adapted when the rod 32 is engaged with the yoke 22 in the manner previously described, to mesh with the gear wheel 28.

In one embodiment of the invention, the gear means 44 comprises a compound bevel gear, the gear wheel 42 comprises a bevel gear and the gear wheel 28 also comprises a bevel gear with these elements of the invention assuming the position shown in FIGURE 1. It is a preferred embodiment of the invention to construct the bracket 34 and rod 32 integrally with each other in the manner shown in FIGURE 1. Whatever the construction of these elements, however, it is essential that they perform the function of permitting the gear wheels 28 and 42 to be meshed with the gear means 44 when the rod 32 or other element which may carry the gear means 44 is positioned to engage or be connected with the yoke 22. It will be apparent that, in some situations, it may be preferable to eliminate the rod 36 and merely use the bed of a trailer or other body carrying the unit to be driven by the driven shaft 12 for supporting the rod 38 and the rod 32 in a manner such that the required spacing and positioning of these elements is maintained in order to retain the various gear elements in their proper relation to each other and in order to permit the rod 32 to be coupled to the yoke means 22.

In referring to FIGURE 1, it will be perceived that the present invention permits the drive shaft 10 to assume any angle or any position relative to the driven shaft 12. The drive shaft 10 can be rotated freely around the idler shaft 18 except for the interference afforded by the yoke 22 and the gear means 44, and such rotational movement of the drive shaft 10 will not result in the disengagement of the worm gear 14 from the gear wheel 16. Also, the yoke 22 may be rocked freely around the idler shaft 18 to any position through 360° except that which is denied it by the interference which will ultimately result between the gear means 44 and/or yoke 22 with the drive shaft 10. It will also be apparent that the idler shaft 18 and all of the elements carried thereby may be bodily rotated about an axis projected through the idler shaft and extending through the center of the circular gear means 44. Such rotation will not disengage the gear wheel 28 from the gear means 44. Finally, the gear wheel 42 may be revolved about the axis of the rod 32 by rotating the supporting arm 30 about this axis so that the driven shaft 12 and gear wheel 42 are bodily revolved about the gear means 44 while being retained at a constant radial distance from the rotational axis of the gear means 44.

Figure 2:
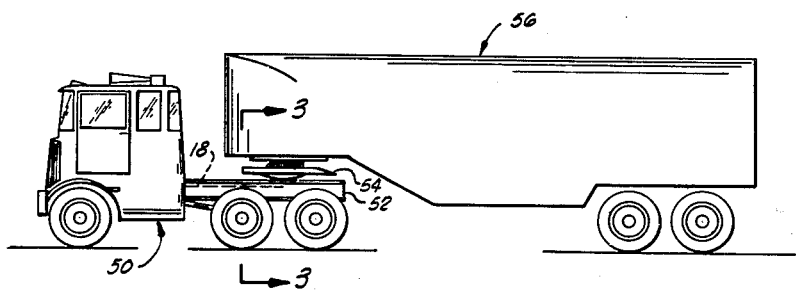
FIGURE 2 is a view in elevation of an interconnected tractor and trailer vehicle using the power transmission coupling of the present invention to transmit power from the power take-off of the tractor vehicle to a power driven unit located on the trailer vehicle.
Figure 3:
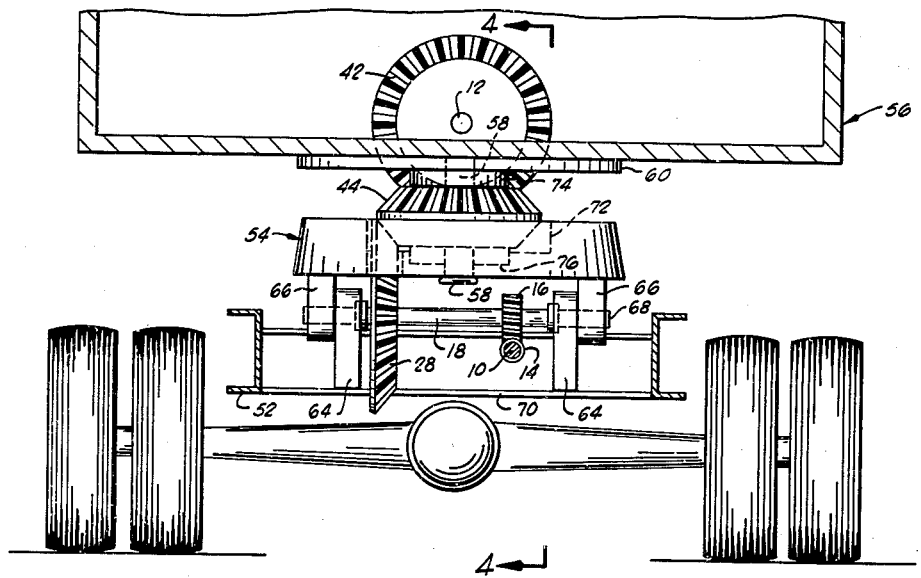
FIGURE 3 is a sectional view taken along line 3—3 of FIGURE 2.
Figure 4:
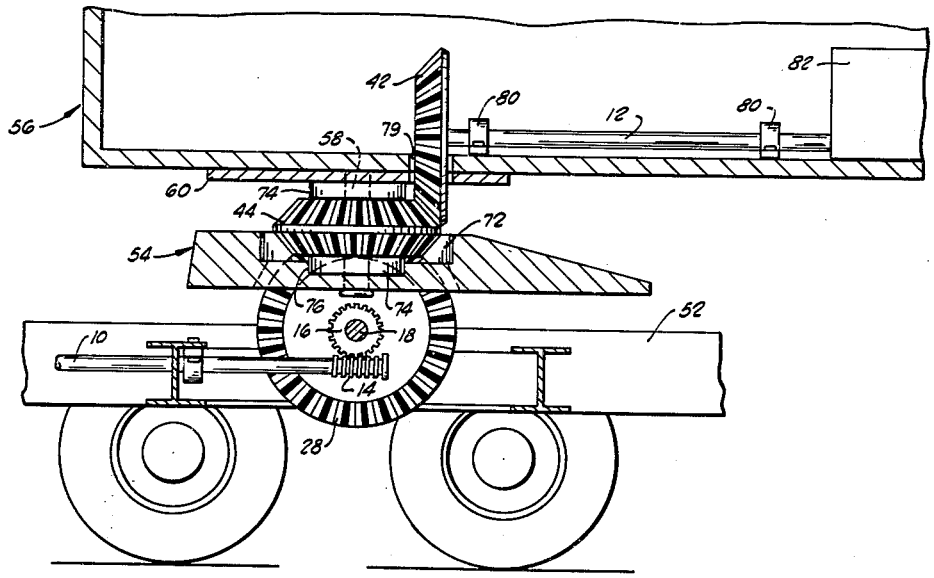
FIGURE 4 is a sectional view taken along line 4—4 of FIGURE 3.

In FIGURES 2, 3 and 4 of the drawings, the manner in which the power transmission assembly or coupling of the present invention is employed to transmit power from a tractor vehicle to a trailer vehicle through the conventional pin and fifth wheel coupling is illustrated. In FIGURE 2, the tractor vehicle is designated by reference character 50 and comprises a frame 52 which supports a fifth wheel 54 to which a trailer vehicle 56 is connected. As is conventional practice in the construction of trailer vehicles of the type described, the trailer is provided near its forward end with a downwardly depending connecting pin 58 which is secured to, and supported from, a suitable reinforcing plate 60.

In connecting the trailer 56 to the tractor 50, the connecting pin 58 is moved through a slot (not seen) in the rear central portion of the fifth wheel 54 to a point at approximately the center of the fifth wheel and is latched in this position against disconnection by a suitable latching mechanism (not seen). The described slotted construction of the fifth whel 54 and the latching mechanism which is employed to retain the pin in engagement therewith are well-known in the art and need not be further described. The fifth wheel 54 is rockably supported on the frame 52 by spaced brackets 64 which rotatably support a pair of cooperating brackets 66 rigidly secured to the underside of the fifth wheel 54 and depending downwardly therefrom. The brackets 64 and 66 are normally interconnected by a short shaft 68 which does not extend completely across the distance between the spaced brackets 64. The brackets 64 are supported upon the frame 52 in any suitable manner, such as welding or riveting to the frame 52.

In adapting the present invention to use in the tractor-trailer arrangement depicted in FIGURE 2, it is desirable, though not required for operability, to recess the upper portion of the fifth wheel 54 to accommodate the lower half of the compound bevel gear 44. The recess in the fifth wheel 54 is designated by reference character 72. The compound bevel gear 44 is rotatably carried by the pin 58 which depends from the trailer 56, and the compound bevel gear 44 is splined or otherwise keyed on the pin 58 against axial movement therealong. Preferably, suitable bearing elements 74 are interposed between the compound bevel gear 44 and the plate 60 and between the compound bevel gear and the fifth wheel 54 so as to prevent the compound bevel gear from binding against these elements in the operation of the power transmission coupling. I have found a desirable construction to be that of providing an additional small recess 76 in the fifth wheel 54 to accommodate the bearing element 74 when the pin 58 is interlocked with the fifth wheel as shown in FIGURES 3 and 4.

The elements of the power transmission coupling of the invention which have been identified and their relationship described in referring to FIGURE 1 carry the same reference numerals and will be recognized in FIGURES 3 and 4. However, in the adaptation of the power transmission coupling of the invention to use in the transmission of power from a tractor to a trailer vehicle, it may be desirable to modify the form assumed by the supporting arm 30 in the FIGURE 1 embodiment of the invention. Thus, the rod 32 is replaced by the connecting pin 58 which is conventionally carried by the trailer vehicle 56. The bracket means 34 which, in the FIGURE 1 embodiment, includes the rods 36 and 38 has been entirely replaced by the bed or body of the trailer vehicle 56 so that the relative position of the gear wheel 42 to the compound bevel gear 44 is maintained by virtue of the fixed position of the gear wheel on the trailer in relation to the fixed position of the connecting pin 58. The gear wheel 42 projects through an aperture 79 formed through the floor of the trailer 56 and the driven shaft 12 which is coaxially keyed to the gear wheel 42 is journalled in pillow blocks 80 mounted on the floor of the trailer vehicle. It will be understood that the driven shaft 12 is drivingly connected to a power driven unit 82, such as an air conditioning unit or other device, located in or on the trailer vehicle 56. It will further be understood that the drive shaft 18 is connected at its forward end (not shown) to the power take-off of the tractor vehicle.

In the operation of the power transmission coupling of the invention as it is employed in transmitting power between a tractor vehicle and a trailer vehicle connected thereto by a connecting pin-fifth whel arrangement, power is intitally transmitted to the coupling through the drive shaft 18 from the power take-off of the tractor vehicle. The worm gear 16 drives the idler shaft 18 through the gear wheel 16 which is keyed thereto. As the idler shaft 18 rotates, the bevel gear 28 is also driven in rotation and transmits the rotational movement of the idler shaft 18 through the compound bevel gear 44 to the bevel gear 42. As the bevel gear 42 is rotated, the driven shaft 12 is also rotated and the rotational movement is transmitted therethrough to the power driven unit 82 on the trailer vehicle.

As the trailer swings from side to side or transversely on the roadway along which the tractor and trailer vehicles are moving, the bevel gear 42 is moved on a radius equivalent to the radius of the compound bevel gear 44. It is therefore constantly retained in mesh with the compound bevel gear 44 despite such transverse swinging movements of the trailer vehicle. If the tractor and trailer vehicles move upwardly relative to each other as a result of unevenness along the roadway over which they are traveling, such motion is accommodated by the rockable mounting of the fifth wheel 54 about the idler shaft 18. Since the axis of rotation of the fifth wheel 54 corresponds to the rotational axis of the idler shaft 18 and since the compound bevel gear 44 is constantly positioned at a distance from said axis which corresponds to the radius of the bevel gear 28, the compound bevel gear 44 will remain in continuous mesh with the bevel gear 28. Thus, the integrity of the power transmission coupling is maintained despite the shifting vertical movements of the tractor and trailer relative to each other.

Finally, in the event that some type of disproportionate loading or mechanical shock were effective to change the horizontal position of the tractor engine relative to the rear portion of the frame 52 and therefore relative to the idler shaft 18 carried thereby, the drive shaft 10 can revolve about the idler shaft 18 while maintaining power transmitting engagement between the worm gear 14 and the gear wheel 16.

It will be apparent that the coupling of the invention effectively provides a non-rotated supporting arm for retaining the various gear elements thereof in mesh, which supporting arm is positioned in such a way that it may be utilized to effect a strong and durable mechanical coupling between the bodies which carry the drive shaft and driven shaft. Also, because of the directly coupled gearing arrangment, a substantial amount of power can be transmitted through the coupling without fatigue or failure of the coupling over extended operating periods.

Although the foregoing description of the invention has included by way of example a description and illustration of certain specific details and elements of one embodiment of the invention, it is to be expected and it is anticipated that certain modifications and innovations may be made in the parts and elements of the invention without departure from the basic principles underlying the invention. Insofar, therefore, as such changes and modifications do not involve a departure from the basic principles upon which the invention is bottomed, it is intended that these changes be encompassed within the spirit and scope of the invention except as the same may be necessarily limited by the appended claims.

I claim:

1. A power transmission assembly for interconnecting a rotating driving shaft to a rotated driven shaft through a non-rotating supporting arm and permitting said interconnected shafts to assume any angle relative to each other, said transmission comprising:
   (a) an idler shaft extending substantially normal to one of said interconnected shafts;
   (b) gear means connected between said one interconnected shaft and said idler shaft for transferring rotary motion between said idler shaft and said one interconnected shaft, said gear means retaining said one interconnected shaft and said idler shaft in power-transmitting engagement when said one interconnected shaft is bodily rotated about the longitudinal axis of said idler shaft in a manner such that the longitudinal axis of said one interconnecting shaft remains in a tangential relationship to an imaginary circle of predetermined radius coaxially positioned with respect to the longitudinal axis of said idler shaft;
   (c) yoke means rotatably journalled on said idler shaft;
   (d) a first gear wheel keyed to said idler shaft for rotation therewith;
   (e) a second gear wheel rotatably supported on said yoke mechanism in spaced relation from said idler shaft and engaging said first gear wheel at a predetermined angle to change the direction of the axis of rotative movement from that of the axis of said first gear wheel;
   (f) a supporting arm rotatably journalled on said yoke means for rotation relative to said second gear wheel and about the axis of rotation of said second gear wheel, said supporting arm rotatably journalling said other interconnected shaft and fixing said shaft in a plane extending through the axis of rotation of said second gear wheel; and
   (g) a third gear wheel coaxially keyed to said other interconnected shaft and drivingly engaging said second gear wheel whereby said third gear wheel may be revolved around the axis of rotation of said second gear wheel when said supporting arm is rotated in said yoke.

2. A power transmission as claimed in claim 1 wherein said gear means comprises a fourth gear wheel mounted on said idler shaft for rotation therewith and a gear keyed to said one interconnected shaft and meshing with said fourth gear wheel.

3. A power transmission as claimed in claim 1 wherein said supporting arm comprises:
   (a) a rod extending through said second gear wheel, journalled on said yoke means and positioned in coincidence with the rotational axis of said gear wheel; and
   (b) bracket means secured to said rod for pivotal movement therewith and rotatably supporting said other interconnected shaft at a fixed point along the length of said shaft from said third gear wheel and retaining said third gear wheel at a constant radial distance from the axis of rotation of said second gear wheel.

4. A power transmission as claimed in claim 1 wherein said yoke means comprises:
   (a) a pair of arms extending substantially normal to said idler shaft and each rotatably journalled thereto through a hub axially keyed to said idler shaft against axial movement therealong; and
   (b) a plate secured to said arms and spaced from said idler shaft, said plate rotatably supporting said second gear wheel.

5. A power transmission coupling comprising:
   (a) a drive shaft;
   (b) a gear wheel driven in rotation by said drive shaft;
   (c) an idler shaft fixed in space extending transversely to the axis of said drive shaft and carrying said gear wheel;
   (d) a rockable yoke member rotatably journalled on said idler shaft for rocking movement about the axis thereof;
   (e) a pin coupling rotatably journalled in said yoke member and rockable therewith relative to said idler shaft;
   (f) intermeshing gears on said idler shaft and said pin coupling, the gear on said pin coupling being rotatably journalled thereon and rotatable about the axis of rotation of said pin coupling as said pin coupling rotates on said yoke, said intermeshing gears being adapted to remain in mesh irrespective of the position to which said yoke is rocked;
   (g) a second gear wheel rotatably carried by said pin coupling and meshing with said gear rotatably mounted on said pin coupling irrespective of the position to which said pin is pivoted on said yoke; and
   (h) a driven shaft coaxially keyed to said second gear wheel.

6. A power transmission assembly interconnecting a power takeoff on a tractor vehicle with a power driven unit on a trailer vehicle of the type connected to the tractor vehicle through an interlocking pin depending vertically downward from the trailer and pivotally engaging a fifth wheel rockably mounted on the tractor vehicle for rocking movement about a transverse axis comprising:
   (a) a drive shaft connected at one end to said power takeoff;
   (b) an idler shaft rotatably supported under said fifth wheel with its axis substantially coincident with the rocking axis of said fifth wheel;
   (c) a gear wheel keyed to said idler shaft and drivingly connected to said drive shaft;
   (d) a second gear wheel rotatably carried on said interlocking pin;
   (e) a third gear wheel keyed to said idler shaft and meshing with said second gear wheel irrespective of the position to which said fifth wheel is rocked and irrespective of the position to which said interlocking pin is rotated after interlocking with said fifth wheel;
   (f) a fourth gear wheel rotatably supported on said trailer vehicle and positioned to mesh with said second gear wheel in all positions to which said trailer vehicle may swing about said interconnecting pin; and
   (g) a driven shaft coaxially keyed to said fourth gear wheel and connected to said power driven unit.

7. A power transmission assembly as claimed in claim 6 wherein said second gear wheel is a compound bevel gear and said third gear wheel is a bevel gear.

8. A power transmission coupling for connecting a trailer vehicle carrying a powered unit through a pin to a fifth wheel of a tractor vehicle having a power takeoff, said transmission comprising:
   (a) a gear wheel mounted on said tractor vehicle and rotatable about an axis extending transversely across the tractor vehicle;
   (b) a drive shaft means flexibly connected from said power takeoff to said gear wheel for driving said gear wheel in rotation, said drive shaft means including an elongated drive shaft mounted for revolvement about the axis of rotation of said gear wheel with one point along the length of said drive shaft describing a circle of fixed radius during said revolvement;

(c) a pair of meshing gears adapted to translate rotational motion in one plane to rotational motion in a second plane extending substantially normal to said first mentioned plane;

(d) means secured to said trailer for rotatably supporting one of said meshing gears in a position to engage said gear wheel when said pin and fifth wheel are engaged and to retain said engagement in all positions of movement in a vertical plane of both said tractor and trailer vehicle relative to each other when said tractor and trailer vehicle are in fore and aft alignment along their longitudinal axes;

(e) means secured to said trailer for rotatably supporting the other of said meshing gears in a position to mesh with said one meshing gear in all positions to which said tractor and trailer vehicle may move relative to each other in a horizontal plane when said vehicles are connected through said pin and fifth wheel; and (f) a shaft carried by said trailer vehicle and drivingly interconnecting said other meshing gear and the powered unit on said trailer vehicle.

9. A power transmission coupling as claimed in claim 8 wherein said means for rotatably supporting said one meshing gear comprises the trailer vehicle pin which engages the fifth wheel of the tractor vehicle.

References Cited by the Examiner
UNITED STATES PATENTS

| | | | |
|---|---|---|---|
| 667,465 | 2/01 | Seeger et al. | 74—385 |
| 2,235,427 | 3/41 | Harris | 74—385 |

DON A. WAITE, *Primary Examiner.*